(12) United States Patent
Imai

(10) Patent No.: US 11,733,117 B2
(45) Date of Patent: Aug. 22, 2023

(54) DETACHABLE PRESSURE DETECTION DEVICE

(71) Applicant: Surpass Industry Co., Ltd., Saitama (JP)

(72) Inventor: Hiroshi Imai, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 0 days.

(21) Appl. No.: 17/655,959

(22) Filed: Mar. 22, 2022

(65) Prior Publication Data

US 2022/0307930 A1 Sep. 29, 2022

(30) Foreign Application Priority Data

Mar. 23, 2021 (JP) ................. 2021-048866

(51) Int. Cl.
*G01L 19/00* (2006.01)
*G01L 7/08* (2006.01)

(52) U.S. Cl.
CPC ........ *G01L 19/003* (2013.01); *G01L 19/0023* (2013.01); *G01L 7/082* (2013.01)

(58) Field of Classification Search
None
See application file for complete search history.

(56) References Cited

U.S. PATENT DOCUMENTS

2016/0377499 A1* 12/2016 Imai .................... G01L 19/0023
73/756
2017/0219396 A1 8/2017 Imai et al.
(Continued)

FOREIGN PATENT DOCUMENTS

EP 3203204 A2 8/2017
EP 3444582 A1 2/2019
(Continued)

OTHER PUBLICATIONS

Extended European Search Report issued in European Application No. 22162905.8, dated Aug. 30, 2022.
(Continued)

*Primary Examiner* — Lisa M Caputo
*Assistant Examiner* — Nigel H Plumb
(74) *Attorney, Agent, or Firm* — Hamilton, Brook, Smith & Reynolds, P.C.

(57) ABSTRACT

Provided is a pressure detection device which prevents variation of pressure detection characteristics. The pressure detection device including: a pressure detection unit configured to detect a pressure transmitted to a pressure detecting surface; a flow passage unit in which a pressure transmitting surface; and a mounting unit for removably mounting the flow passage unit on the pressure detection unit. The pressure detection unit has a sensor unit having the pressure detecting surface, a holding unit configured to hold the sensor unit to be movable along an axis orthogonal to the pressure detecting surface, and an urging unit configured to generate urging force to urge the sensor unit toward the pressure transmitting surface. The mounting unit mounts the flow passage unit on the pressure detection unit with the pressure detecting surface being in contact with the pressure transmitting surface under urging force generated by the urging unit.

7 Claims, 16 Drawing Sheets

(56) References Cited

U.S. PATENT DOCUMENTS

| | | | |
|---|---|---|---|
| 2018/0038770 A1* | 2/2018 | Osawa | .................. G01L 19/003 |
| 2019/0011321 A1* | 1/2019 | Kobayashi | .......... G01L 19/0023 |
| 2019/0056280 A1 | 2/2019 | Abo et al. | |
| 2022/0307931 A1 | 9/2022 | Hasunuma | |

FOREIGN PATENT DOCUMENTS

| | | |
|---|---|---|
| JP | 2017009467 A | 1/2017 |
| JP | 2019015568 A | 1/2019 |

OTHER PUBLICATIONS

European Search Report issued in European Application No. 22162906.6, dated Jul. 22, 2022.

\* cited by examiner

DETACHABLE PRESSURE DETECTION DEVICE

RELATED APPLICATION

This application claims priority under 35 U.S.C. § 119 or 365 to Japanese Patent Application No. 2021-048866 filed on Mar. 23, 2021. The entire teachings of the above application are incorporated herein by reference.

BACKGROUND

1. Technical Field

The present disclosure relates to a pressure detection device.

DESCRIPTION OF RELATED ART

A conventionally known pressure detection device includes a flow passage unit provided with a pressure transmitting surface formed on a part of a flow passage that allows liquid to flow therethrough, a pressure detection unit that detects pressure transmitted to a pressure detecting surface, and a mounting mechanism by which these units are removably mounted (see, for example, Japanese Unexamined Patent Application, Publication No. 2019-15568).

In the pressure detection device disclosed in Japanese Unexamined Patent Application, Publication No. 2019-15568, the flow passage unit is removably mounted on the pressure detection unit, and thus a used flow passage unit can be replaced with a new flow passage unit.

When a flow passage unit is replaced, the pressure transmitting surface of a used flow passage unit separates from the pressure detecting surface of the pressure detection unit, and a pressure transmitting surface of a new flow passage unit then comes into contact with a pressure detecting surface of the pressure detection unit.

In the pressure detection device disclosed in Japanese Unexamined Patent Application, Publication No. 2019-15568, the internal thread formed in the inner circumferential surface of a nut rotatably attached to the flow passage unit is screwed onto the external thread of the flow passage unit, and thereby the pressure detecting surface of a pressure sensor comes into contact with the pressure transmitting surface of the flow passage unit.

In the pressure detection device disclosed in Japanese Unexamined Patent Application, Publication No. 2019-15568, however, the strength of force to cause the pressure detecting surface of the pressure detection unit and the pressure transmitting surface of the flow passage unit to come into contact with each other depends on the strength of the operator's force to screw the internal thread of the nut and the external thread of the flow passage unit with each other. Thus, it is not possible to have always the same strength of force to cause the pressure detecting surface of the pressure detection unit to come into contact with the pressure transmitting surface of the flow passage unit, and the pressure detection characteristics obtained by the pressure detection unit may vary.

SUMMARY

The present disclosure has been made in view of such circumstances and intends to prevent variation of the pressure detection characteristics obtained by a pressure detection unit in a pressure detection device including a mounting unit used for removably mounting a flow passage unit on the pressure detection unit.

To solve the problem described above, the present disclosure employs the following solutions.

A pressure detection device according to one aspect of the present disclosure includes: a pressure detection unit configured to detect a pressure transmitted to a pressure detecting surface; a flow passage unit in which a flow passage configured to cause a fluid to flow in a flow direction from an inflow port to an outflow port and a pressure transmitting surface used for transmitting, to the pressure detecting surface, a pressure of a fluid flowing through the flow passage are formed; and a mounting unit used for removably mounting the flow passage unit on the pressure detection unit. The pressure detection unit has a sensor unit having the pressure detecting surface, a holding unit configured to hold the sensor unit movably along an axis orthogonal to the pressure detecting surface, and an urging unit configured to generate urging force to urge the sensor unit toward the pressure transmitting surface. The mounting unit mounts the flow passage unit on the pressure detection unit with the pressure detecting surface being in contact with the pressure transmitting surface under urging force generated by the urging unit.

According to the pressure detection device of one aspect of the present disclosure, since the flow passage unit is removably mounted on the pressure detection unit, when a fluid to be passed through the flow passage is changed, a used flow passage unit may be removed from the pressure detection unit, and an unused flow passage unit may be newly mounted on the pressure detection unit. Thus, when a fluid to be passed through the flow passage is changed, cleaning work for the flow passage that would otherwise take a long time is no longer required, and the speed of work can be increased. Further, since an unused flow passage unit can be newly used, safety can be enhanced.

Further, according to the pressure detection device of one aspect of the present disclosure, the mounting unit mounts the flow passage unit on the pressure detection unit with the pressure detecting surface being in contact with the pressure transmitting surface under the urging force generated by the urging unit. Since the pressure detecting surface is in contact with the pressure transmitting surface under the urging force generated by the urging unit, the strength of force with which the pressure detecting surface contacts the pressure transmitting surface is always the same, and this can prevent variation of the pressure detection characteristics obtained by the pressure detection unit.

The pressure detection device according to one aspect of the present disclosure is preferably configured such that the holding unit has a protrusion protruding in a direction orthogonal to the axis, the mounting unit is mounted on the flow passage unit rotatably about the axis and has a groove configured to accept the protrusion, the groove has a first groove extending in the axis and having an open one end, and a second groove connected to the other end of the first groove and extending circumferentially about the axis, and the sensor unit is positioned at a predetermined position on the axis when the second groove is pressed against the protrusion by the urging force generated by the urging unit.

According to the pressure detection device of the configuration described above, when the operator holds the mounting unit rotatably mounted on the flow passage unit and presses the mounting unit against the pressure detection unit in a state where the circumferential positions of the first groove and the protrusion are matched, thereby the protrusion is inserted in the first groove. When the mounting unit is pressed against the pressure detection unit, the pressure detecting surface is in contact with the pressure transmitting surface under the urging force generated by the urging unit.

The operator then rotates the mounting unit within a range less than one turn about the axis, thereby the protrusion is inserted in the second groove connected to the first groove, and the sensor unit is positioned at a predetermined position on the axis. The state where the pressure detecting surface is in contact with the pressure transmitting surface under the urging force generated by the urging unit is maintained with the sensor unit being positioned.

The operator is able to mount the flow passage unit on the pressure detection unit by a relatively easy operation of pressing the mounting unit against the pressure detection unit and then rotating the mounting unit within a range less than one turn about the axis. Further, it is possible to remove the flow passage unit from the pressure detection unit by a relatively easy operation of rotating the mounting unit within a range less than one turn about the axis in the reverse direction. It is therefore possible to quickly mount and remove the flow passage unit on and from the pressure detection unit compared to a case where the operator rotates a nut about the axis for multiple times to mount and remove the flow passage unit on and from the pressure detection unit as with the case of Japanese Unexamined Patent Application, Publication No. 2019-15568.

The pressure detection device of the configuration described above is preferably configured such that the second groove has a recess formed in a shape corresponding to an outer circumferential surface of the protrusion, and the mounting unit is restricted from rotating about the axis when the recess is pressed against the protrusion by the urging force generated by the urging unit.

According to the pressure detection device of the configuration described above, the operator rotates the mounting unit about the axis to arrange the recess of the second groove at the position of the protrusion, and thereby the recess is pressed against the protrusion by the urging force generated by the urging unit. Since the recess is formed in a shape corresponding to the shape of the protrusion, once the recess is pressed against the protrusion, the mounting unit is restricted from being rotated about the axis and is locked.

Thus, unless the operator presses and rotates the mounting unit about the axis with pressing force against the urging force applied by the urging unit, the flow passage unit is not removed from the pressure detection unit. It is thus possible to reliably maintain the state where the flow passage unit is mounted on the pressure detection unit.

The pressure detection device according to one aspect of the present disclosure is preferably configured to include a sensing unit configured to detect that circumferential positions about the axis of the recess and the protrusion are matched.

By using the sensing unit to detect that the circumferential positions about the axis of the recess and the protrusion are matched, it is possible to detect that the flow passage unit is secured on the pressure detection unit.

The pressure detection device of the configuration described above is preferably configured such that a magnet is attached to any one of the pressure detection unit and the mounting unit, and the sensing unit is attached to the other of the pressure detection unit and the mounting unit, detects that the magnet is arranged at a proximate position, and when the circumferential positions about the axis of the recess and the protrusion are matched, the magnet is arranged at the proximate position.

According to the pressure detection device of the configuration described above, when the circumferential positions about the axis of the recess and the protrusion are matched, the sensing unit attached to any one of the pressure detection unit and the mounting unit detects that the magnet attached to the other of the pressure detection unit and the mounting unit is arranged at a proximate position. Accordingly, it is possible to reliably detect a state where the flow passage unit is mounted on the pressure detection unit.

The pressure detection device according to one aspect of the present disclosure is preferably configured such that the mounting unit has a knob extending in a direction orthogonal to the axis and configured to enable an operator to apply, in a direction along the axis, pressing force against the urging force generated by the urging unit.

According to the pressure detection device described above, the operator is able to easily mount the flow passage unit to the pressure detection unit by applying pressing force via the knob against the urging force generated by the urging unit to the mounting unit.

According to the present disclosure, it is possible to prevent variation of the pressure detection characteristics obtained by a pressure detection unit in a pressure detection device including a mounting unit used for removably mounting a flow passage unit on the pressure detection unit.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

With reference to the drawings, a pressure detection device 100 according to an embodiment of the present disclosure is described below.

Figure 1:
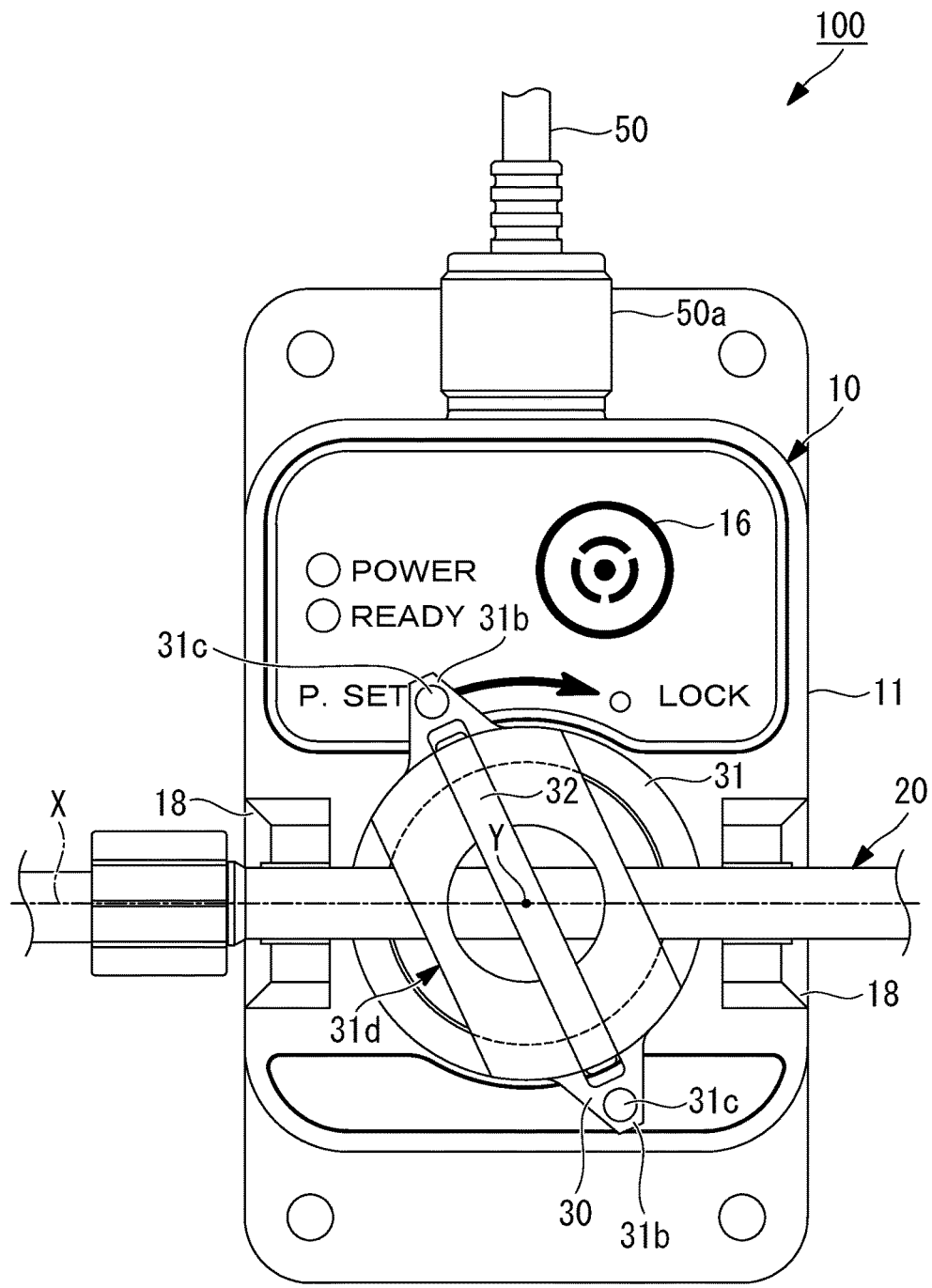
FIG. 1 is a plan view illustrating a pressure detection device of one embodiment of the present disclosure.
Figure 2:
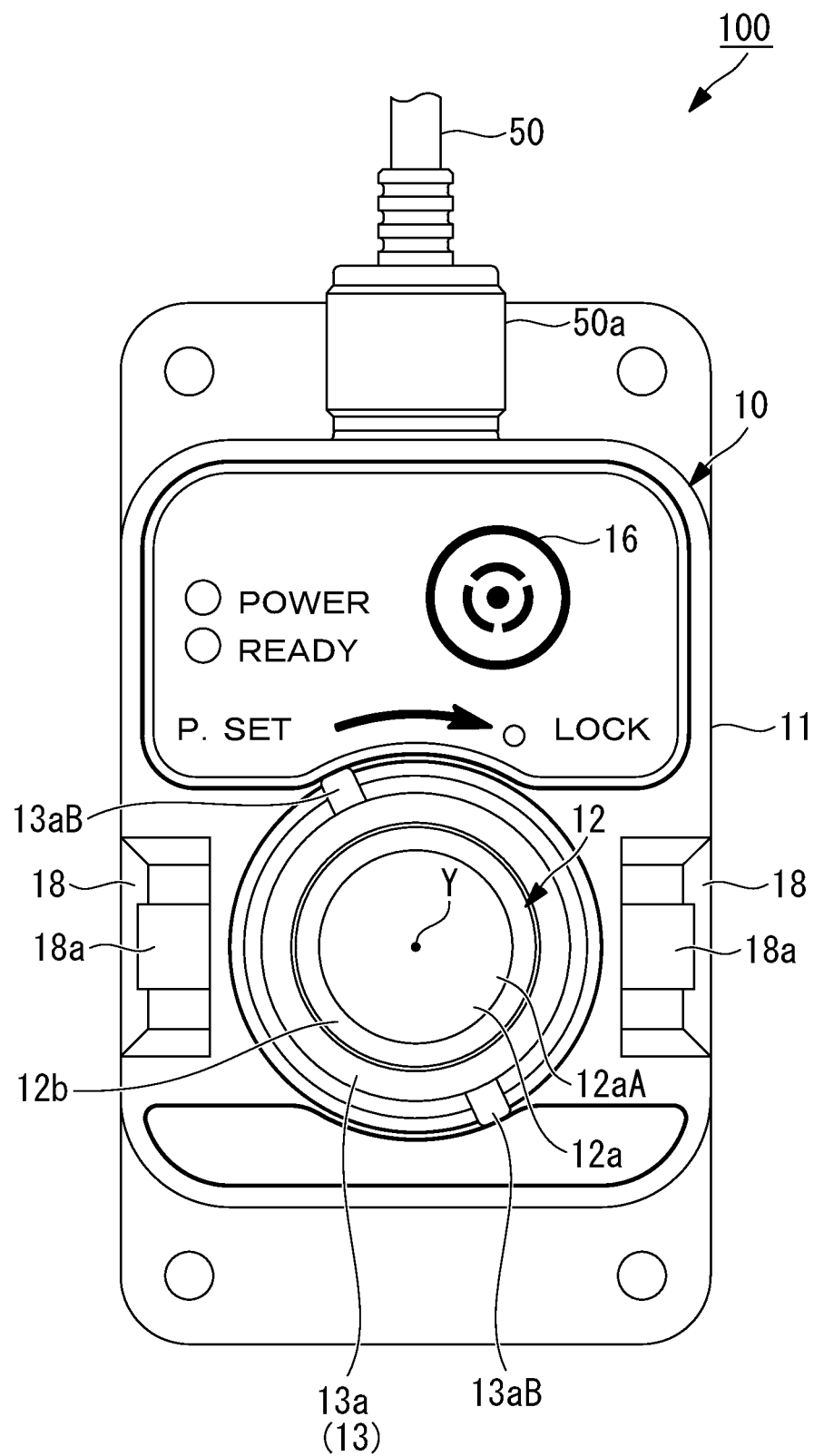
FIG. 2 is a plan view illustrating a state where a flow passage unit has been removed from the pressure detection device illustrated in FIG. 1.

As shown in FIG. 1 and FIG. 2, the pressure detection device 100 according to this embodiment includes a pressure detection unit 10, a flow passage unit 20, and a mounting unit 30. The pressure detection unit 10 is mounted on an installation surface S (see FIG. 3) by fastening bolts (not shown). The flow passage unit 20 includes a flow passage 21 formed therein to allow liquid (fluid) to flow through the flow passage 21 along a straight-line flow direction from an inflow port 21a to an outflow port 21b. The mounting unit 30 allows the flow passage unit 20 to be removably mounted on the pressure detection unit 10.

In the pressure detection device 100 according to this embodiment, the flow passage unit 20 is mounted on the pressure detection unit 10 by the mounting unit 30. The pressure detection device 100 is mounted on the installation surface S in a state where the flow passage unit 20 is mounted integrally on the pressure detection unit 10 by the mounting unit 30.

Figure 3:
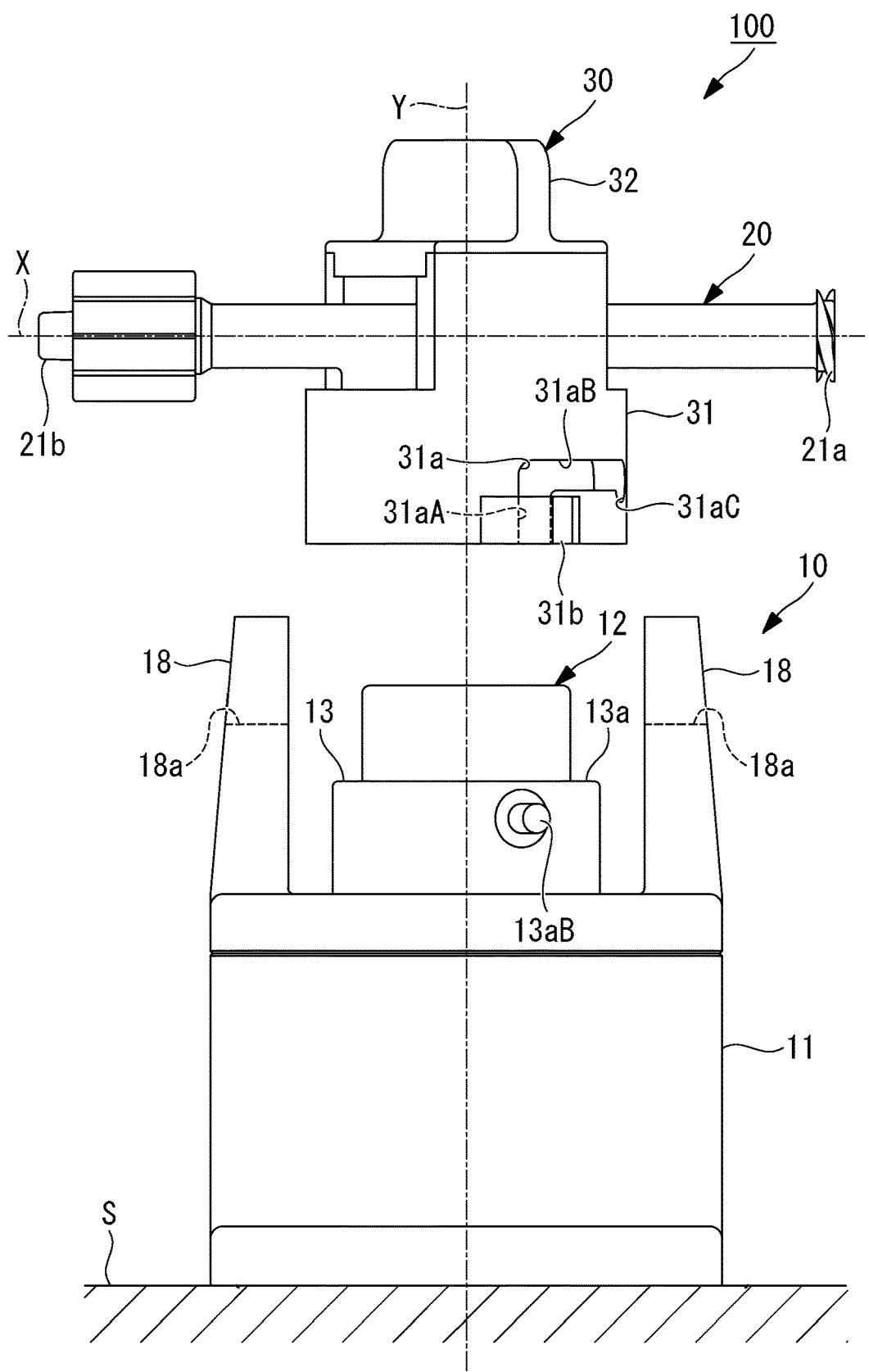
FIG. 3 is a front view illustrating a state where the flow passage unit has been removed from a pressure detection unit illustrated in FIG. 1.

As shown in FIG. 3, the inflow port 21a of the flow passage unit 20 is attached to an inflow pipe (not shown) that allows fluid to flow in the inflow port 21a. The outflow port 21b of the flow passage unit 20 is attached to an outflow pipe (not shown) that allows fluid flowing out from the outflow port 21b to flow therethrough. The pressure detection unit 10 detects pressure of fluid flowing through the flow passage 21 from the inflow port 21a to the outflow port 21b. In this embodiment, fluid means liquid such as blood or a dialysate.

As shown in FIG. 3, the pressure detection unit 10 includes a body 11 mounted on the installation surface S. As shown in FIG. 1 and FIG. 2, on the body 11 of the pressure detection unit 10, a cable 50 is mounted via a cable mounting nut 50a. The cable 50 electrically connects a sensor unit 12 arranged in the body 11 to a control device (not shown) arranged outside the body 11.

Figure 4:
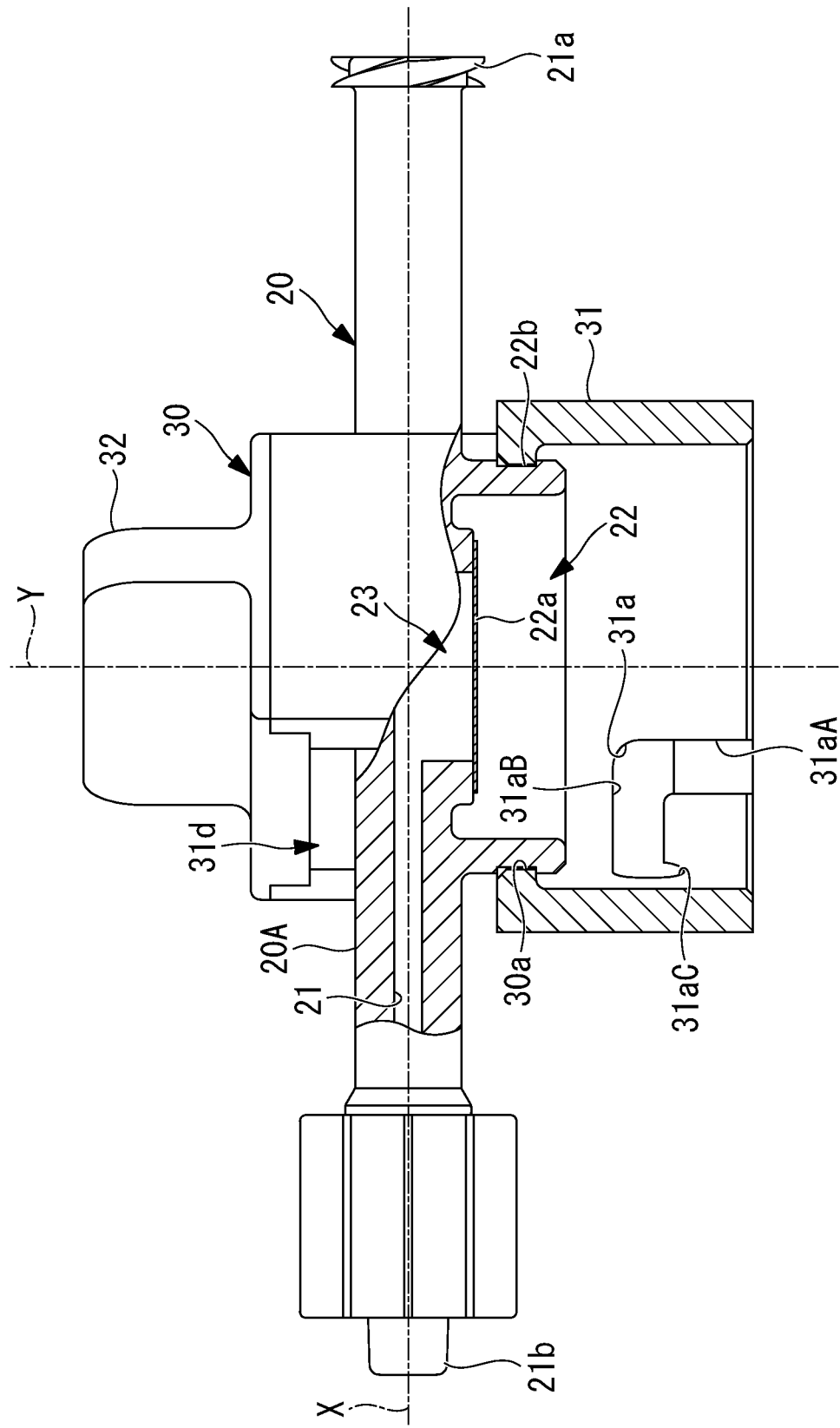
FIG. 4 is a partial sectional view of the flow passage unit and a mounting unit illustrated in FIG. 3.
Figure 5:
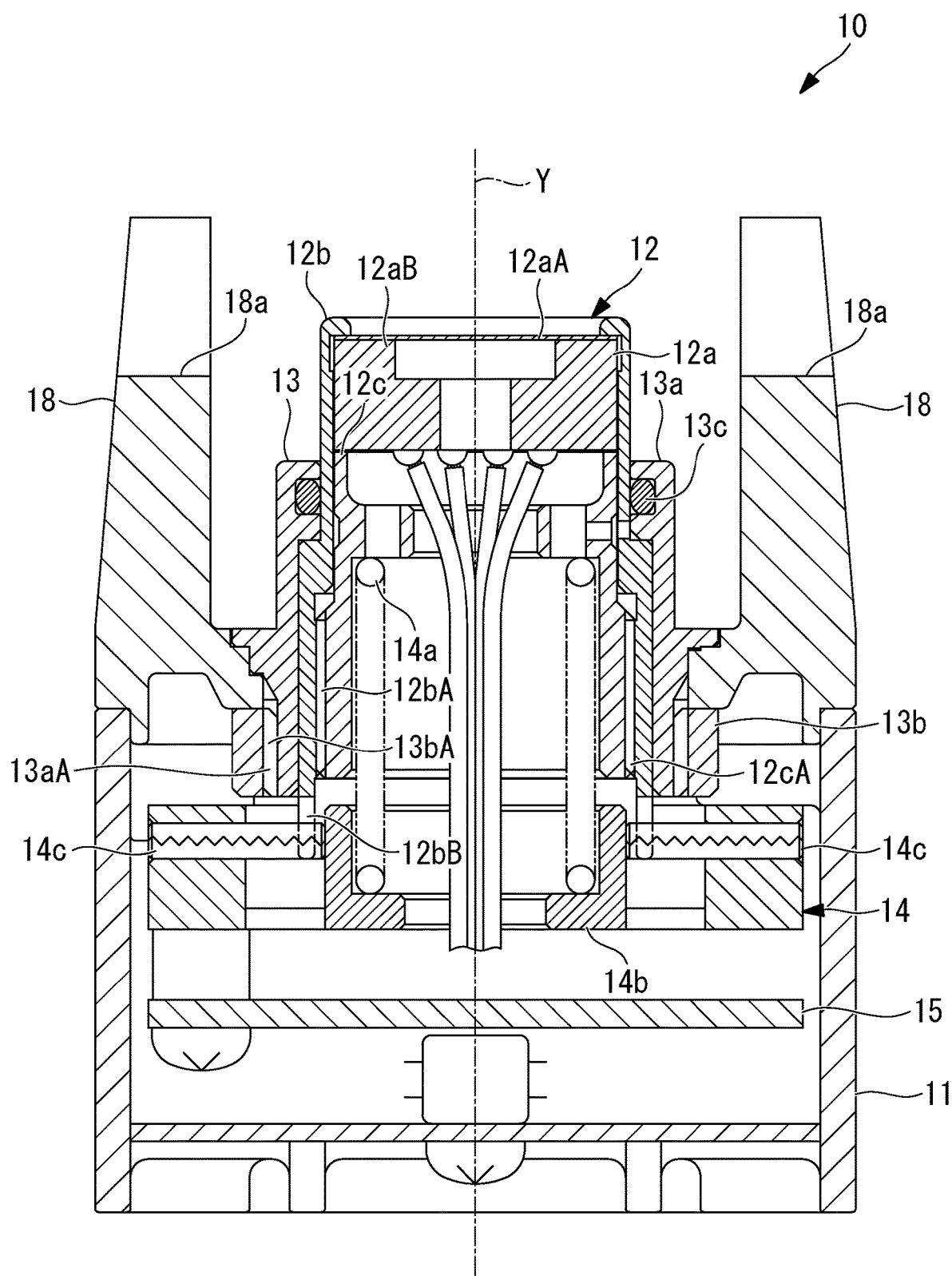
FIG. 5 is a longitudinal sectional view of the pressure detection unit illustrated in FIG. 3.

Next, the pressure detection unit 10 will be described in detail with reference to FIG. 1 to FIG. 5. The pressure detection unit 10 illustrated in FIG. 1 to FIG. 5 is a device that detects the pressure of a fluid transferred to a pressure detecting surface 12aA. FIG. 3 is a front view illustrating a state where the flow passage unit 20 has been removed from a pressure detection unit 10 illustrated in FIG. 1. FIG. 4 illustrates a partial cross section of the flow passage unit 20 and the mounting unit 30 illustrated in FIG. 3. FIG. 5 is a longitudinal sectional view of the pressure detection unit 10 illustrated in FIG. 3.

As illustrated in FIG. 5, the pressure detection unit 10 has a body 11, a sensor unit 12, a holding unit 13, an urging unit 14, a sensor board 15, a zero-point adjusting switch 16 (see FIG. 1), a mounting detection sensor (sensing unit) 17, and a guide member (guide part) 18.

As illustrated in FIG. 5, the sensor unit 12 has a sensor body 12a, a housing member 12b, and a support member 12c. The sensor body 12a has the pressure detecting surface 12aA to which a distortion resistor is attached and a base part 12aB to which the pressure detecting surface 12aA is attached. The sensor body 12a is a distortion type sensor that outputs a pressure signal in accordance with a change in the resistance of a distortion resistor that deforms together with the pressure detecting surface 12aA in accordance with a transmitted pressure.

A through hole (not illustrated) that communicates with the pressure detecting surface 12aA is formed in the base part 12aB, and one of the surfaces of the pressure detecting surface 12aA is maintained at an atmospheric pressure. Thus, the sensor body 12a serves as a sensor that detects a gauge pressure based on the atmospheric pressure as a reference. The pressure detecting surface 12aA is formed in a thin film with an anti-corrosion material (for example, sapphire).

As illustrated in FIG. 5, the housing member 12b extends along the axis Y and is formed in a cylindrical shape, which is a member to house the sensor body 12a therein. An internal thread 12bA is formed in the inner circumferential surface of the housing member 12b. The internal thread 12bA engages with an external thread 12cA formed on the outer circumferential surface of the support member 12c.

Two slits 12bB formed circumferentially in two portions and opened to the lower end are formed around the lower end of the housing member 12b. Each slit 12bB is inserted in a detent pin 14c that prevents the sensor unit 12 from rotating about the axis Y together with the mounting unit 30 when the operator rotates the mounting unit 30 about the axis Y.

As illustrated in FIG. 5, the support member 12c extends along the axis Y and is formed in a cylindrical shape, which is a member to support the sensor body 12a inside the housing member 12b. The external thread 12cA is formed on the outer circumferential surface of the support member 12c. The sensor body 12a is fixed inside the housing member 12b by inserting the sensor body 12a in the housing member 12b and screwing and fastening the external thread 12cA of the support member 12c into the internal thread 12bA of the housing member 12b.

The holding unit 13 is a member extending along the axis Y and formed in a cylindrical shape, which is a member to hold the sensor unit 12 movably along the axis Y orthogonal to the pressure detecting surface 12aA. The holding unit 13 has a body 13a, a fixing member 13b, and an O-ring 13c. The O-ring 13c in contact with the outer circumferential surface of the housing member 12b of the sensor unit 12 is attached to the inner circumferential surface of the body 13a.

An external thread 13aA is formed in the outer circumferential surface of the lower end of the body 13a, and an internal thread 13bA is formed on the inner circumferential surface of the fixing member 13b. The body 13a is fixed to the guide member 18 mounted on the body 11 by screwing and fastening the internal thread 13bA of the fixing member 13b onto the external thread 13aA of the body 13a.

The urging unit (pushing unit) 14 generates urging force to urge the sensor unit 12 against the pressure transmitting surface 22a of the flow passage unit 20. The urging unit 14 has a spring 14a, a base member 14b, and a detent pin 14c. The spring 14a is arranged with one end thereof being in contact with the base member 14b fixed to the body 11 and the other end being in contact with the support member 12c of the sensor unit 12. The spring 14a generates urging force in accordance with the distance along the axis Y from one end, which is in contact with the base member 14b, to the other end.

The detent pin 14c is a member extending in a direction orthogonal to the axis Y and formed in a shaft and is fixed to the base member 14b. The detent pin 14c is inserted in the pair of slits 12bB formed in the lower end of the housing member 12b. The detent pin 14c prevents the sensor unit 12 from rotating about the axis Y together with the mounting unit 30 when the operator rotates the mounting unit 30 about the axis Y.

The sensor board 15 includes an amplifier circuit (not shown) that amplifies a pressure signal output from the sensor body 12a, an interface circuit that transmits the pressure signal amplified by the amplifier circuit to a pressure signal line (not shown) of the cable 50, a power supply circuit (not shown) that transmits a power supply voltage supplied from outside via the cable 50 to the sensor body 12a, a zero-point adjustment circuit (not shown) that performs a zero-point adjustment when the zero-point adjustment switch 16 is pressed. The zero-point adjustment circuit performs an adjustment such that, at the time when the zero-point adjustment switch 16 is pressed, a pressure signal output from the sensor body 12a is set as a reference value (for example, zero).

As illustrated in FIG. 3 and FIG. 5, the sensor unit 12 and the holding unit 13 of the pressure detection unit 10 protrude upward along the axis Y out of the body 11 with the pressure detecting surface 12aA being arranged at the top. As illustrated in FIG. 2 and FIG. 3, the holding unit 13 has a pair of protrusions 13aB protruding in a direction orthogonal to the axis Y from the outer circumferential surface of the body 13a.

As illustrated in FIG. 2, the protrusions 13aB formed on the outer circumferential surface of the holding unit 13 are formed in two portions spaced apart from each other by 180 degrees about the axis Y. As illustrated in FIG. 2, when the flow passage unit 20 is not mounted on the pressure detection unit 10, the pressure detecting surface 12aA of the sensor unit 12 is exposed to outside.

A mounting detection sensor 17 (see FIG. 13) is a sensor that detects that the flow passage unit 20 has been mounted on the pressure detection unit 10. The mounting detection sensor 17 detects that the circumferential positions about the axis of a recess 31aC of a groove 31a of the mounting unit 30 described later and the protrusion 13aB of the pressure detection unit 10 are matched.

Guide members 18 include grooves 18a that guide the flow passage 21 to a predetermined mounting position when the flow passage unit 10 is mounted on the pressure detection unit 10. The guide members 18 are provided in pairs symmetrically on the axis Y1. The respective guide members 18 in pairs guide a part of the flow passage 21 on the side of the inflow port 21a and a part of the flow passage 21 on the side of the outflow port 21b to the predetermined mounting position.

Next, with reference to FIGS. 1, 3 and 4, the flow passage unit 20 is described in detail.

As shown in FIG. 4, the flow passage unit 20 includes a flow passage body 20A formed with the flow passage 21, the recess 22, and the opening 23. The flow passage 21 allows fluid to flow therethrough in a flow direction extending along the axis X (first axis) from the inflow port 21a to the outflow port 21b. The recess 22 includes the pressure transmitting surface 22a arranged on the bottom thereof. The opening 23 opens in a direction along an axis Y orthogonal to the axis X.

The pressure transmitting surface 22a is a diaphragm formed in a thin film shape and formed of a material (for example, polycarbonate (PC)) having corrosion resistance. The pressure transmitting surface 22a is formed in a circular shape in a planar view and is centered at the axis Y. An outer peripheral edge of the pressure transmitting surface 22a is joined to the flow passage body 20A by bonding or welding so as to close the opening 23. Consequently, fluid introduced to the flow passage 21 does not flow out of the flow passage 21. Since the pressure transmitting surface 22a is formed in a thin film shape, the pressure transmitting surface 22a is displaced along the axis Y by pressure of fluid introduced into the flow passage 21.

In a state shown in FIG. 3 where the flow passage unit 20 has been detached from the pressure detection unit 10, the pressure transmitting surface 22a of the flow passage unit 20 is spaced apart from the pressure detecting surface 12aA of the pressure detection unit 10. On the other hand, in a state shown in FIG. 13, describe later, where the flow passage unit 20 has been mounted on the pressure detection unit 10, the pressure transmitting surface 22a of the flow passage unit 20 is in contact with the pressure detecting surface 12aA of the pressure detection unit 10. Thus, the pressure transmitting surface 22a transmits pressure of fluid flowing through the flow passage 21 to the pressure detecting surface 12aA.

In a state shown in FIG. 4 where the flow passage unit 20 is not mounted on the pressure detection unit 10, the pressure transmitting surface 22a is exposed to the outside. Nevertheless, an operator has a less risk of touching the pressure transmitting surface 22a, since the pressure transmitting surface 22a is arranged on the bottom of the recess 22.

As shown in FIG. 4, on an outer peripheral surface of the recess 22 of the flow passage unit 20, an endless annular groove 22b is formed to extend about the axis Y. On an inner peripheral surface of the mounting unit 30, an endless annular protrusion 30a is formed to extend about the axis Y. The mounting unit 30 is formed of an elastically deformable material (for example, a resin material). When the mounting unit 30 is pressed toward the annular groove 22b formed on the outer peripheral surface of the recess 22, the annular protrusion 30a is engaged with the annular groove 22b.

In a state shown in FIG. 4 where the annular protrusion 30a is engaged with the annular groove 22b, a minute gap is formed between an outer peripheral surface of the annular protrusion 30a and an inner peripheral surface of the annular groove 22b. Accordingly, the mounting unit 30, which is mounted on the flow passage unit 20, is rotatable about the axis Y relative to the sensor unit 12 and the holding unit 13. This enables an operator to rotate the mounting unit 30 about the axis Y in a state where the pressure detection unit 10 is fixed to the installation surface S.

As illustrated in FIG. 3, the mounting unit 30 is a member extending along the axis Y and formed in a cylindrical shape and has a connecting member 31 and a knob 32. The mounting unit 30 is mounted on the flow passage unit 20 rotatably about the axis Y. As illustrated in FIG. 3 and FIG. 4, the connecting member 31 has the groove 31a that accepts a protrusion 13aB protruding out of the body 13a of the holding unit 13.

The groove 31a has a first groove 31aA extending along the axis Y and opened at the lower end and a second groove 31aB connected to the upper end of the first groove 31aA and extending circumferentially about the axis Y. The second groove 31aB has the recess 31aC formed in a shape corresponding to the outer circumferential surface of the protrusion 13aB at the other end on the circumferentially opposite side of one end connected to the first groove 31aA. The second groove 31aB is formed circumferentially in a range less than one turn about the axis Y from one end connected to the first groove 31aA to the other end in which the recess 31aC is formed. This range is desirably a range of ¼ turns or less (a range of rotation angle of 45 degrees or less), for example.

A housing hole 31d used for housing the flow passage body 20A of the flow passage unit 20 is formed in the connecting member 31. The housing hole 31d is formed circumferentially with a predetermined opening width so that the flow passage body 20A is rotatable about the axis Y with respect to the connecting member 31. After the flow passage unit 20 is installed in the housing hole 31d of the connecting member 31, the knob 32 is mounted on the upper end of the connecting member 31, and thereby the flow passage unit 20 is housed in the housing hole 31d.

The knob 32 is a member that extends in the direction orthogonal to the axis Y and enables the operator to apply, in the direction along the axis Y, pressing force against urging force generated by the urging unit 14. Further, the knob 32 is a member that enables the operator to apply force to rotate the mounting unit 30 circumferentially about the axis Y.

As illustrated in FIG. 1, a pair of magnet holding parts 31b are formed in the connecting member 31 at positions on an extension line of the knob 32 extending straight. A magnet 31c is attached to each of the pair of magnet holding parts 31b.

Next, an operation to mount the flow passage unit 20 on the pressure detection unit 10 will be described.

The operator may work in the following procedure when mounting the flow passage unit 20 on the pressure detection unit 10 mounted on the installation surface S.

First, as illustrated in FIG. 3, the center axis of the pressure detection unit 10 and the center axis of the flow passage unit 20 are matched to the axis Y, and the flow passage unit 20 is arranged such that the circumferential position about the axis Y of the protrusion 13aB of the pressure detection unit 10 and the circumferential position about the axis Y of the first groove 31aA of the mounting unit 30 are matched.

Next, the operator moves the flow passage unit 20 downward along the axis Y while maintaining the state illustrated in FIG. 3 and inserts the sensor unit 12 of the pressure detection unit 10 in the recess 22 of the flow passage unit 20. Once the sensor unit 12 is inserted in the recess 22, the pressure detecting surface 12aA of the sensor unit 12 is in contact with the pressure transmitting surface 22a of the flow passage unit 20.

Figure 6:
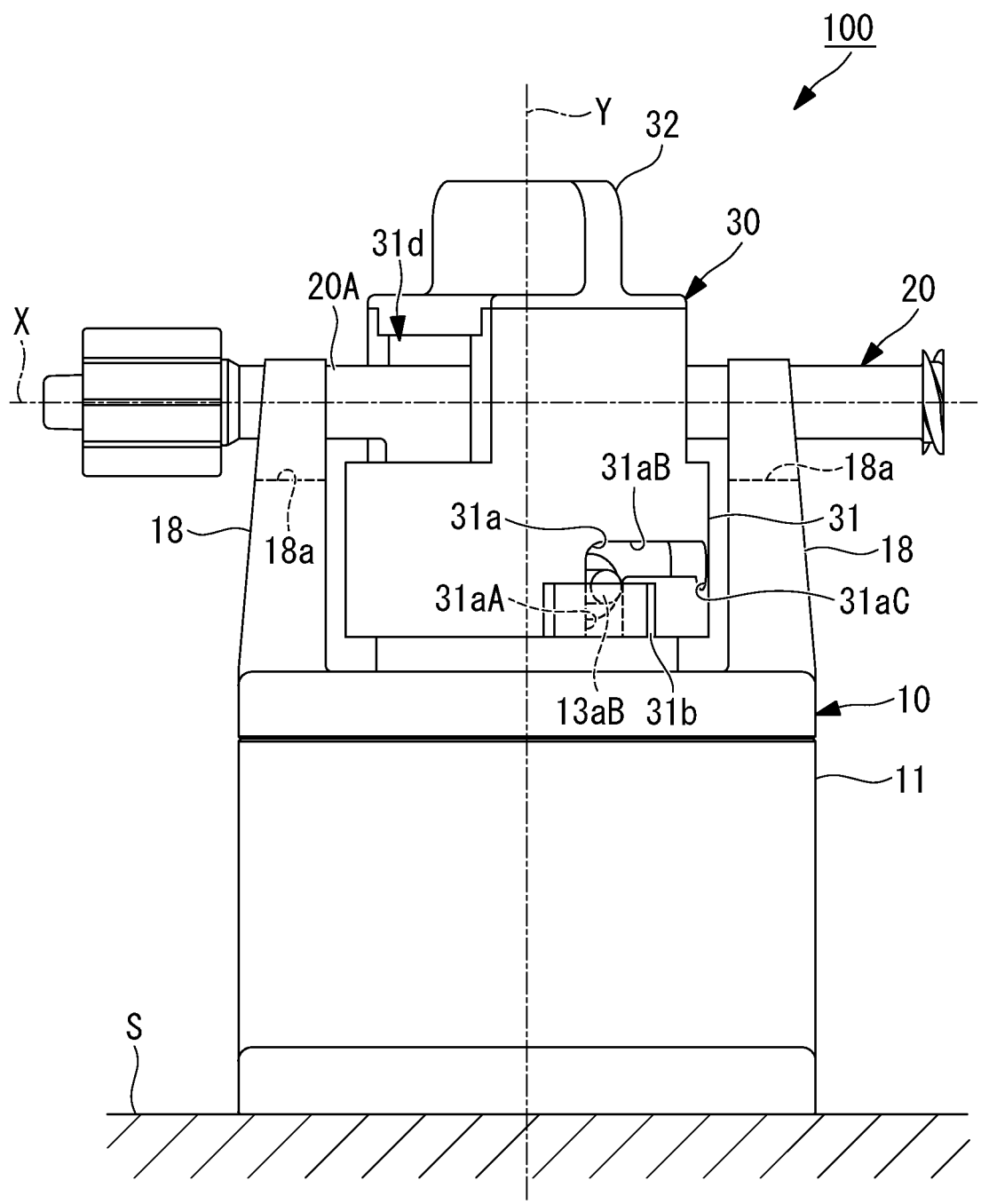
FIG. 6 is a front view of the pressure detection device illustrated in FIG. 1.

As illustrated in FIG. 6, the protrusion 13aB of the pressure detection unit 10 has been inserted in the first groove 31aA of the mounting unit 30 with the pressure detecting surface 12aA being in contact with the pressure transmitting surface 22a. In a state where the operator does not apply pressing force to press the knob 32 downward, the urging unit 14 generates urging force to support the weight of the mounting unit 30 and the flow passage unit 20.

Next, the operator applies pressing force to press the mounting unit 30 downward while gripping the knob 32 in the state illustrated in FIG. 6. Once the downward pressing force is applied to the mounting unit 30, the spring 14a of the urging unit 14 contracts, and the protrusion 13aB of the pressure detection unit 10 reaches the upper end of the first groove 31aA. The operator rotates the knob 32 clockwise circumferentially about the axis Y in a state where the protrusion 13aB has reached the upper end of the first groove 31aA and inserts the protrusion 13aB in the second groove 31aB into a state illustrated in FIG. 7.

Figure 7:
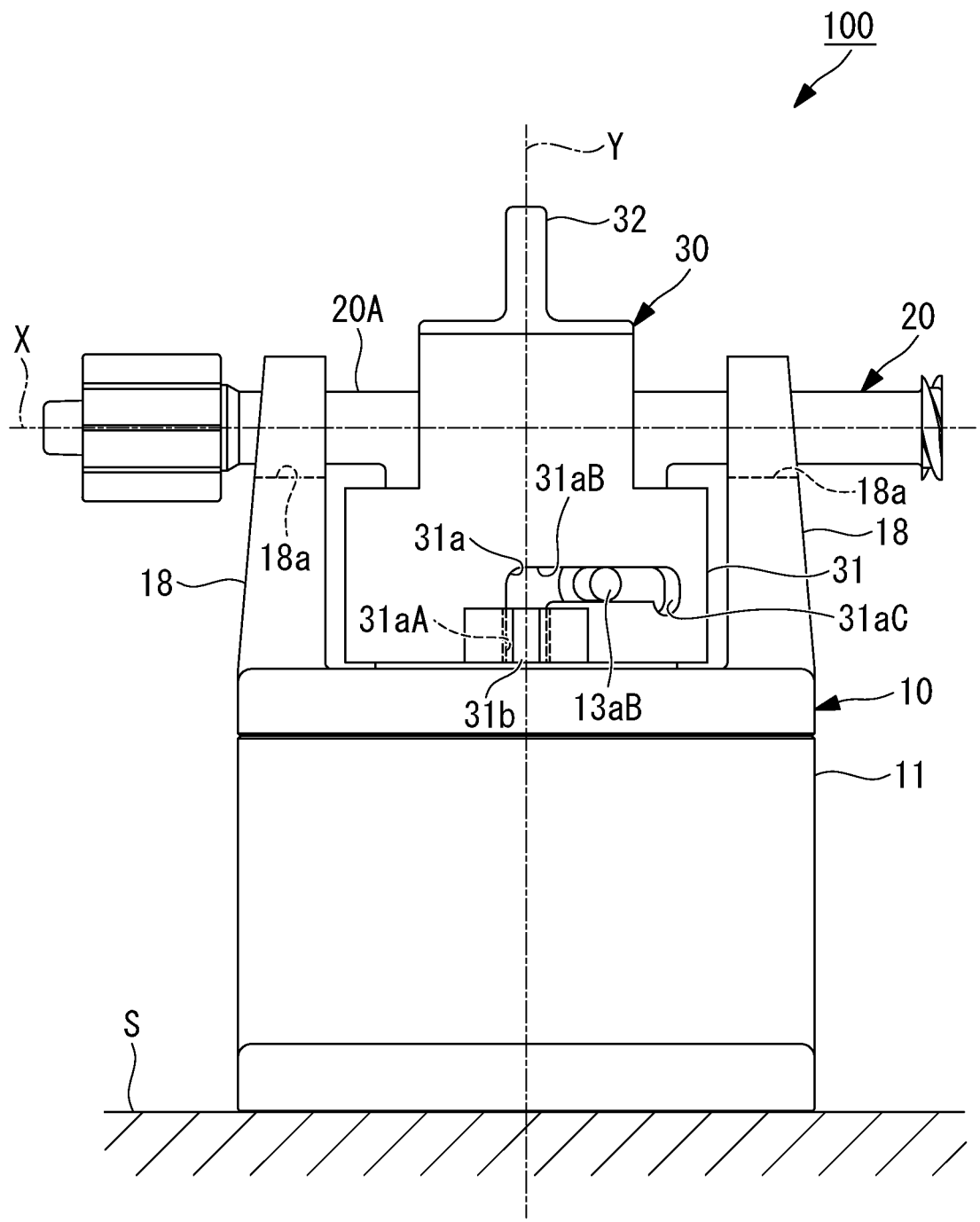
FIG. 7 is a front view illustrating the pressure detection device during the mounting unit being rotated from a release position to a lock position.
Figure 8:
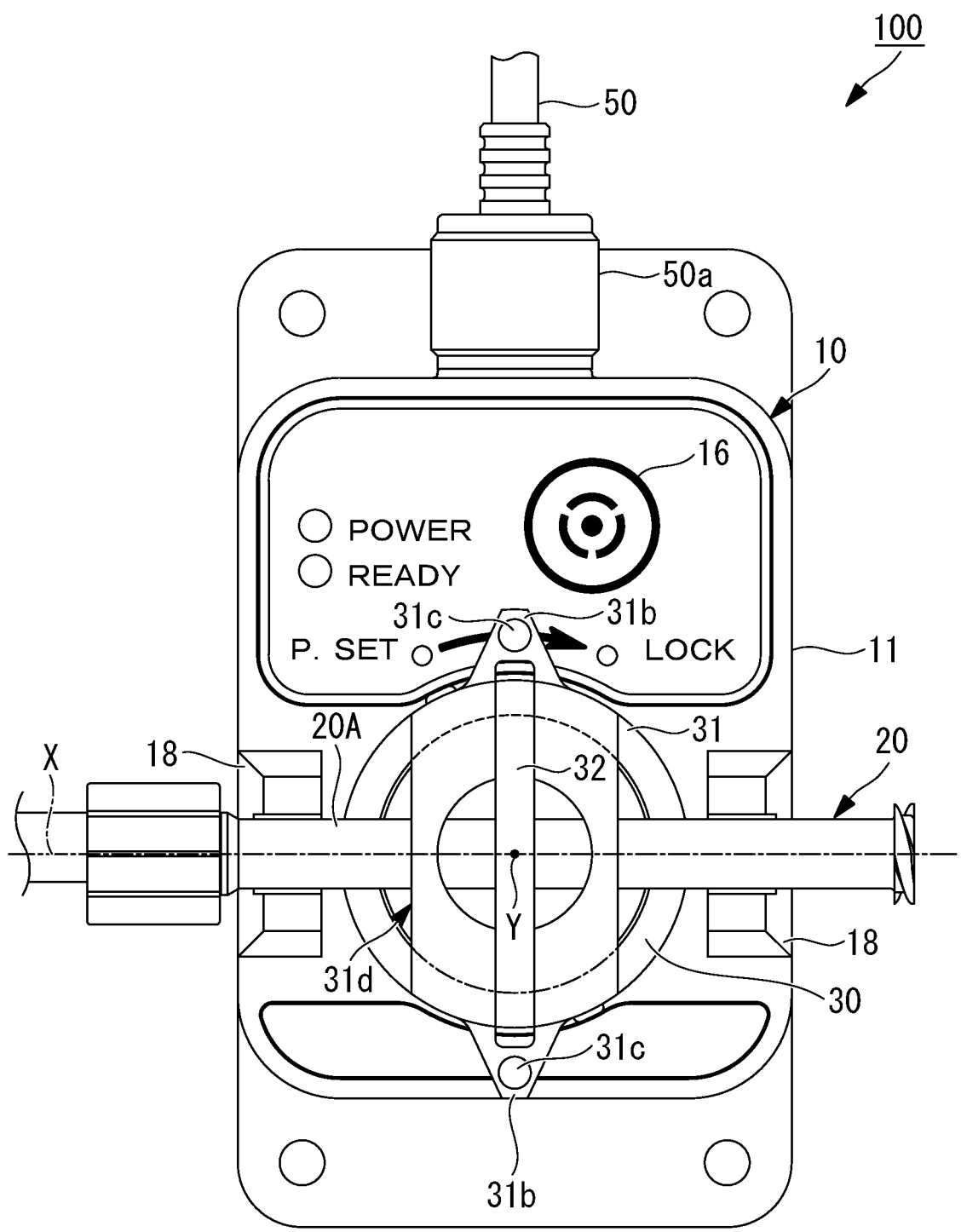
FIG. 8 is a plan view of the pressure detection device illustrated in FIG. 7.
Figure 9:
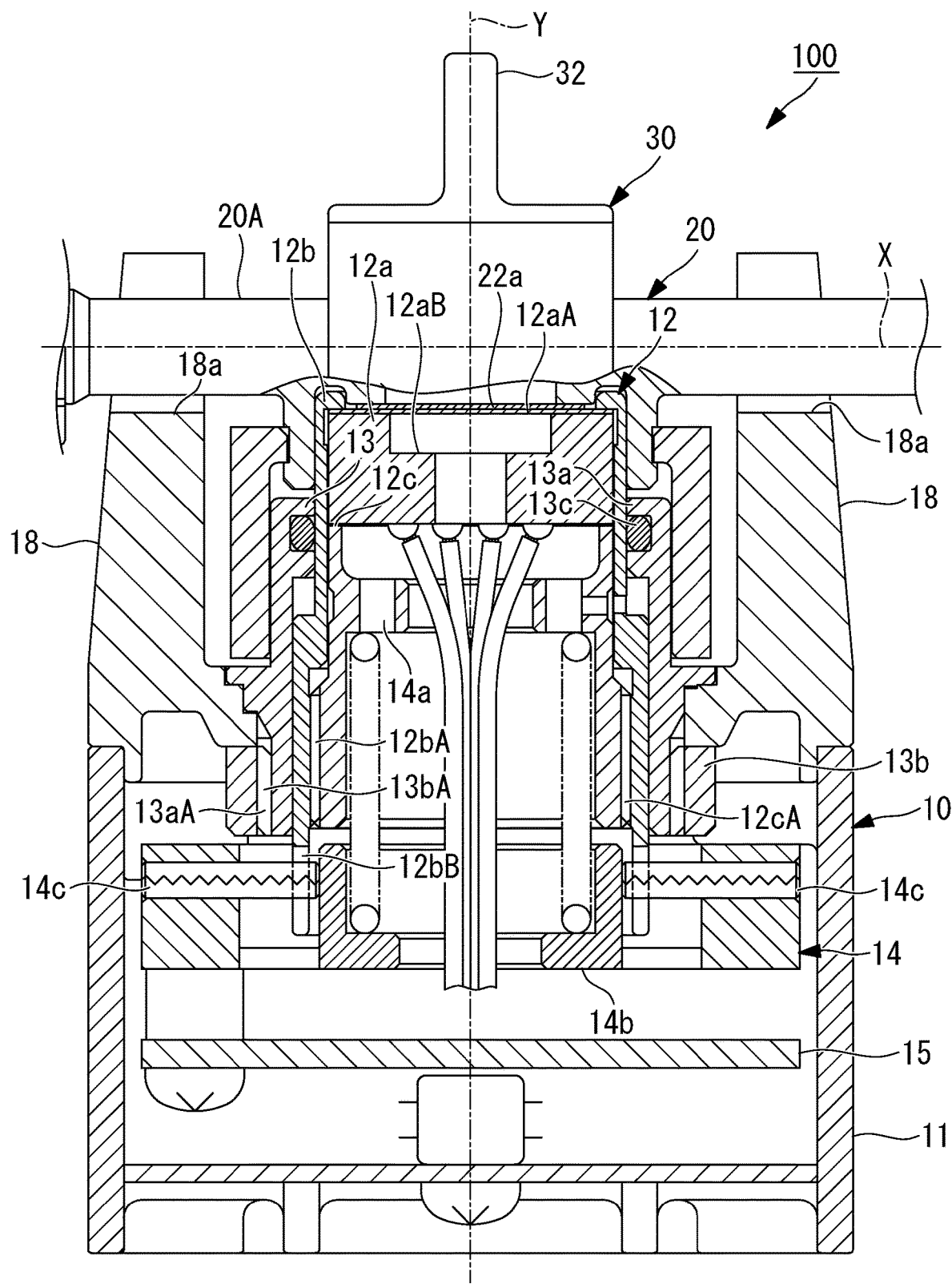
FIG. 9 is a longitudinal sectional view of the pressure detection device illustrated in FIG. 7.

FIG. 7 is a front view illustrating the pressure detection device 100 during the mounting unit 30 being rotated from a release position to a lock position. FIG. 8 is a plan view of the pressure detection device 100 illustrated in FIG. 7. FIG. 9 is a longitudinal sectional view of the pressure detection device 100 illustrated in FIG. 7. As illustrated in FIG. 8, in the pressure detection device 100 during the mounting unit 30 being rotated from the release position (the position illustrated in FIG. 6) to the lock position, the knob 32 is arranged so as to extend in a direction orthogonal to both the axis X in which the flow passage body 20A extends and the axis Y.

As illustrated in FIG. 9, in the pressure detection device 100 during the mounting unit 30 being rotated from the release position to the lock position, the mounting unit 30 mounts the flow passage unit 20 on the pressure detection unit 10 with the pressure detecting surface 12aA being in contact with the pressure transmitting surface 22a under the urging force generated by the urging unit 14.

In the state illustrated in FIG. 7, even if the operator reduces the force to press the knob 32 downward or releases the knob 32, the mounting unit 30 to which upward urging force is applied by the urging unit 14 is restricted from moving upward in the direction of the axis Y. This is because the second groove 31aB comes into contact with the protrusion 13aB even if the mounting unit 30 is forced to move upward by the urging force of the urging unit 14.

Figure 10:
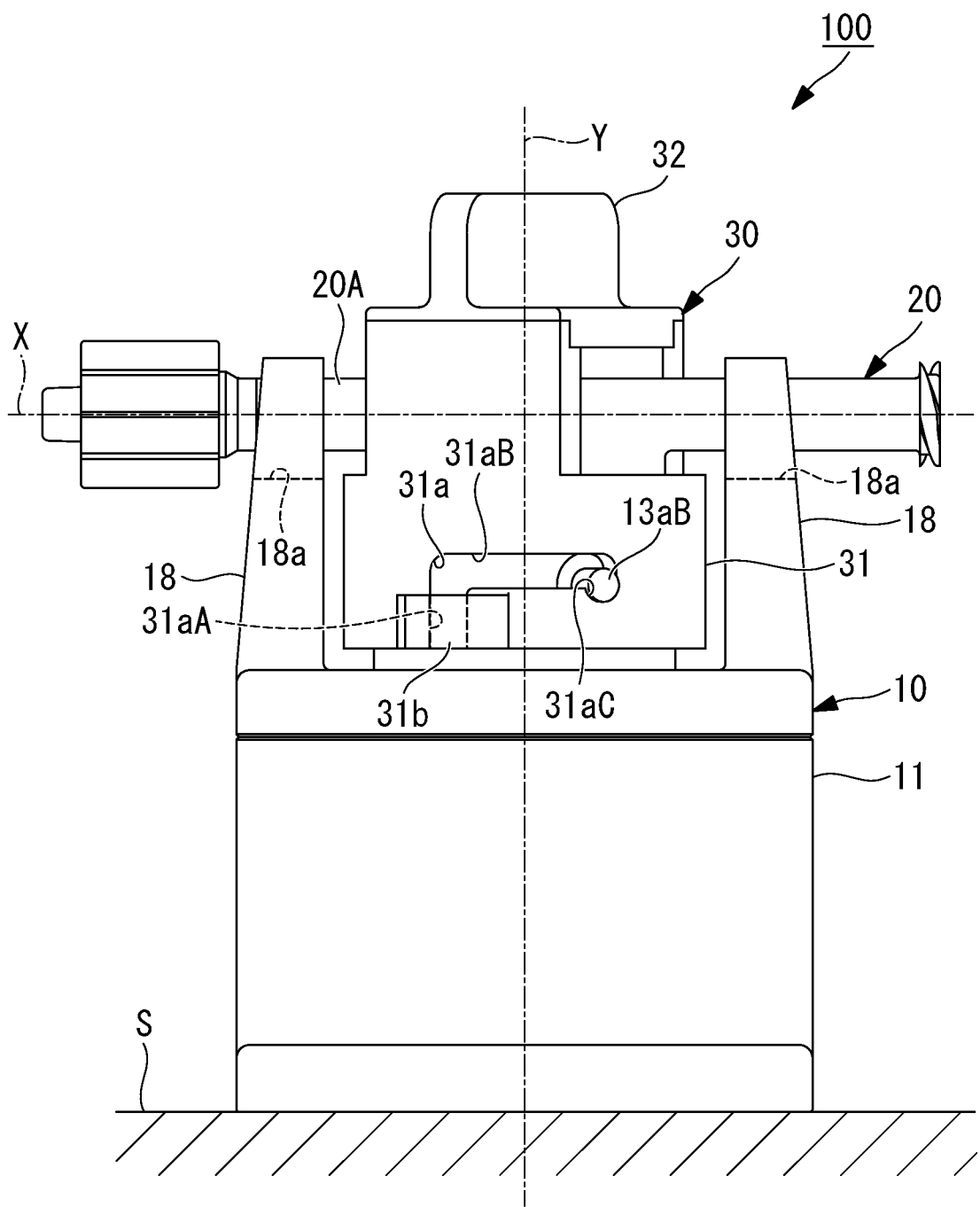
FIG. 10 is a front view illustrating the pressure detection device after the mounting unit has been rotated to the lock position.

Next, the operator rotates the knob 32 clockwise circumferentially about the axis Y while gripping the knob 32 in the state illustrated in FIG. 7 and presses the recess 31aC arranged at the end of the second groove 31aB against the protrusion 13aB into a state illustrated in FIG. 10. As illustrated in FIG. 10, the recess 31aC is formed in a shape recessed downward along the axis Y from the second groove 31aB and corresponding to the outer circumferential surface of the protrusion 13aB.

Figure 11:
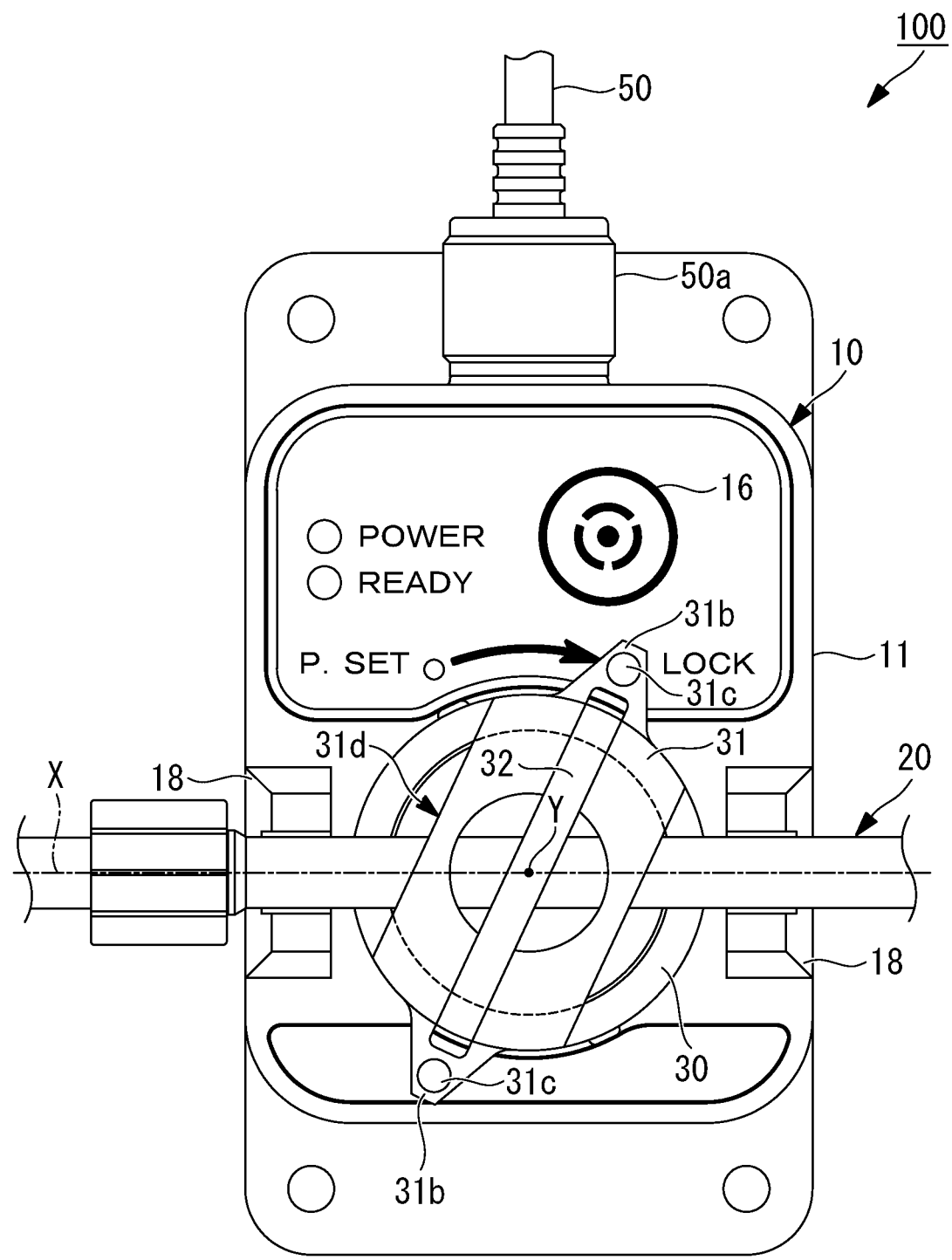
FIG. 11 is a plan view of the pressure detection device illustrated in FIG. 10.
Figure 12:
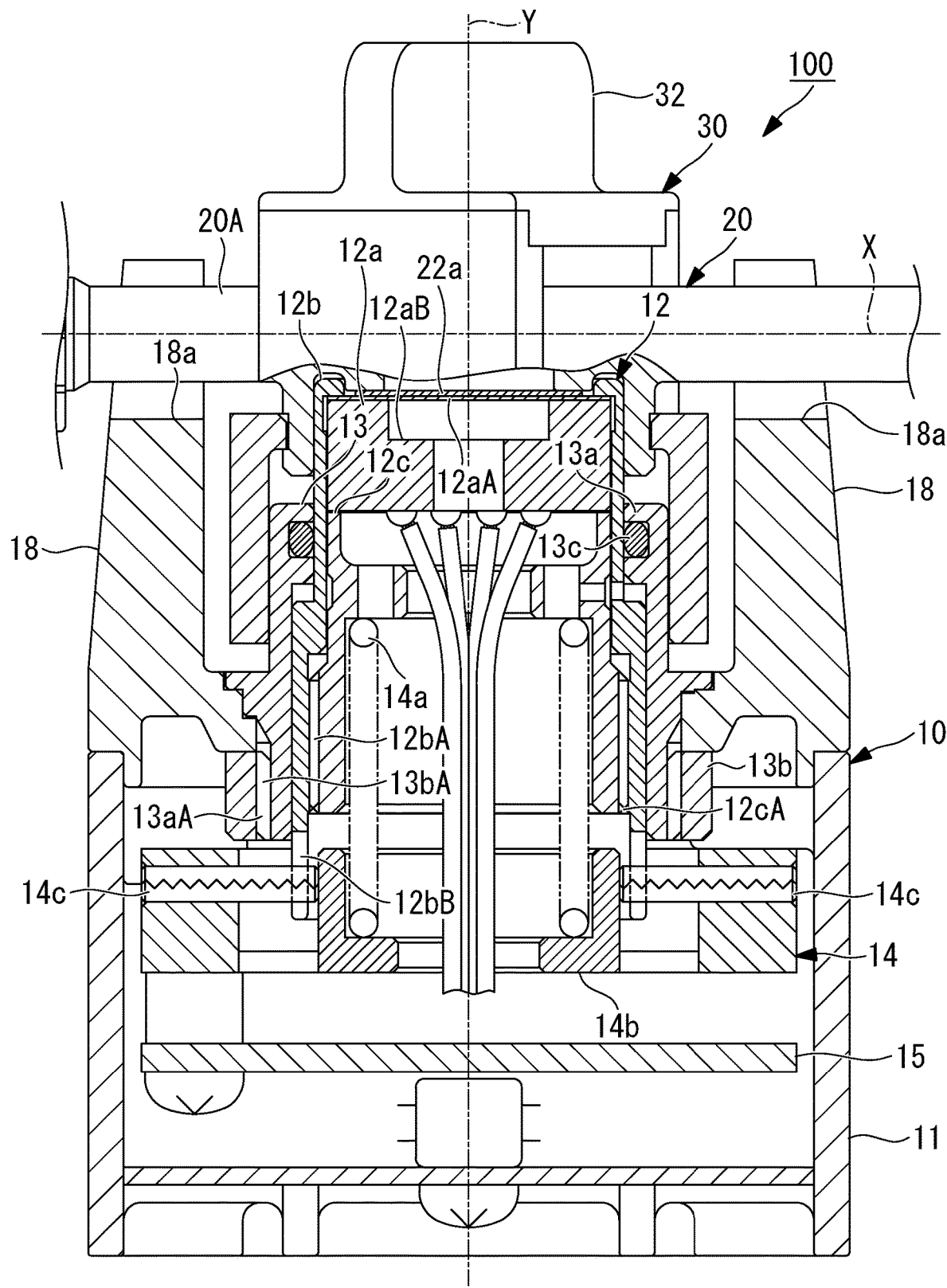
FIG. 12 is a longitudinal sectional view of the pressure detection unit illustrated in FIG. 10.

FIG. 10 is a front view illustrating the pressure detection device 100 after the mounting unit 30 has been rotated to the lock position. FIG. 11 is a plan view of the pressure detection device 100 illustrated in FIG. 10. FIG. 12 is a longitudinal sectional view of the pressure detection device 100 illustrated in FIG. 10.

As illustrated in FIG. 10, in a state where the mounting unit 30 has been rotated to the lock position, the recess 31aC of the second groove 31aB is pressed against the protrusion 13aB by the urging force generated by the urging unit 14, and thereby the sensor unit 12 is positioned at a predetermined position on the axis Y.

Further, the mounting unit 30 is restricted from rotating about the axis Y when the recess 31aC is pressed against the protrusion 13aB by the urging force generated by the urging unit 14. This is because, once the recess 31aC is pressed against the protrusion 13aB, unless the operator applies pressing force to press the knob 32 downward, the knob 32 is unable to be rotated anticlockwise.

In the above description, the operation to mount the flow passage unit 20 on the pressure detection unit 10 by rotating the mounting unit 30 from the release position to the lock position has been illustrated. An operation to remove the flow passage unit 20 from the pressure detection unit 10 will be an operation to rotate the mounting unit 30 from the lock position to the release position.

When removing the flow passage unit 20 from the pressure detection unit 10, the operator presses the knob 32 downward to separate the recess 31aC from the protrusion 13aB and rotates the knob 32 anticlockwise into the state illustrated in FIG. 7. The operator further rotates the knob 32 anticlockwise into the state illustrated in FIG. 6. The operator then pulls the mounting unit 30 upward while dripping the knob 32 and thereby separates the flow passage unit 20 from the pressure detection unit 10.

Figure 13:
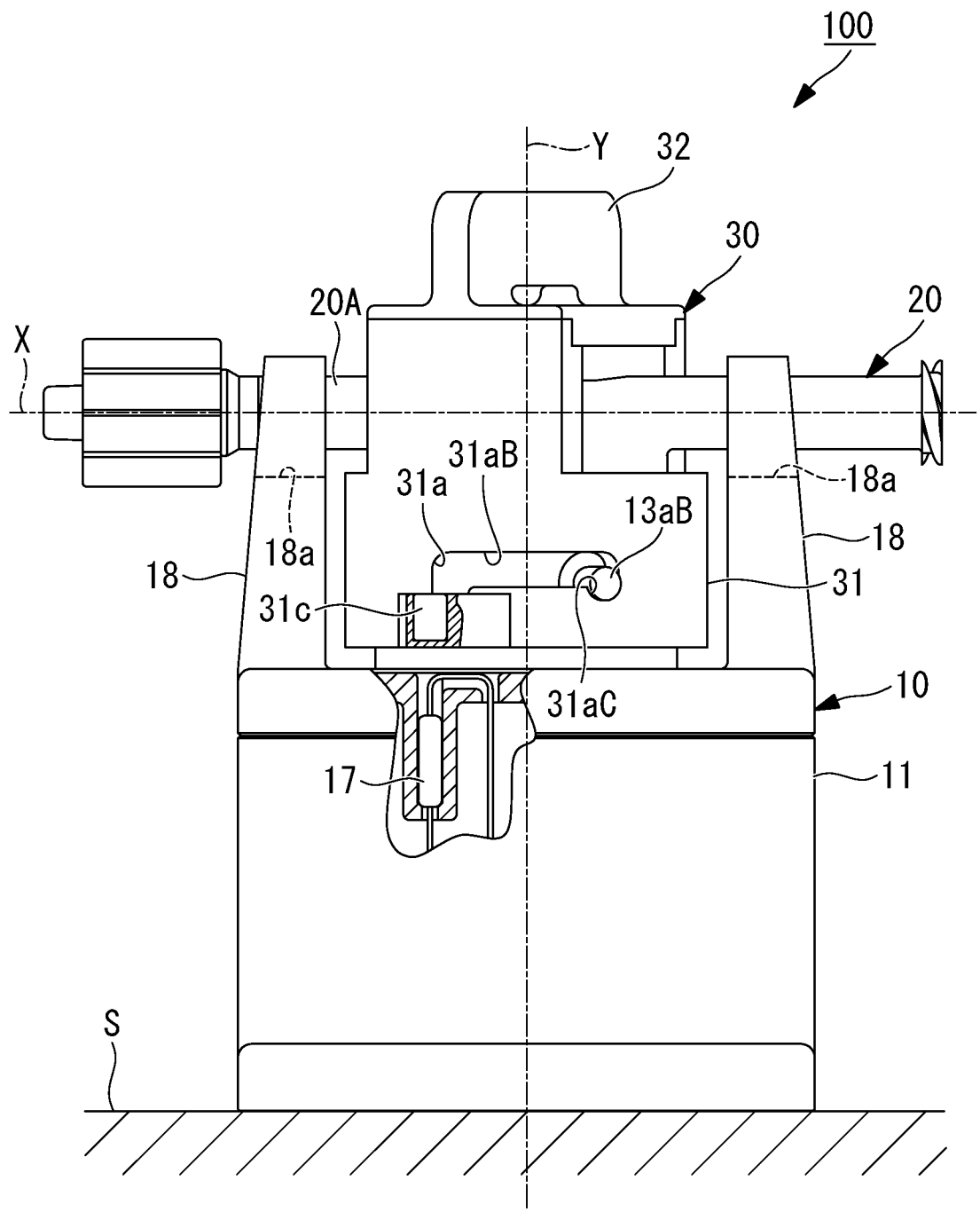
FIG. 13 is a partial sectional view illustrating the pressure detection device after the mounting unit has been rotated to the lock position.

Next, the mounting detection sensor 17 that detects that the flow passage unit 20 has been mounted on the pressure detection unit 10 will be described with reference to FIG. 13. FIG. 13 is a partial sectional view illustrating the pressure detection device 100 after the mounting unit 30 has been rotated to the lock position. As illustrated in FIG. 13, the mounting detection sensor 17 is attached to the body 11 of the pressure detection unit 10. The mounting detection sensor 17 is a lead switch, for example, which is a sensor that is switched on in response to detecting that a magnet is arranged at a proximate position.

As illustrated in FIG. 13, when the circumferential positions about the axis Y of the recess 31aC and the protrusion 13aB are matched, the mounting detection sensor 17 is arranged at a proximate position of the magnet 31c. As illustrated in FIG. 11, when the magnet 31c is held by each of the pair of the magnet holding parts 31b, the mounting detection sensor 17 can be arranged at any one of the positions at which the magnets 31c are arranged when the mounting unit 30 is in the lock position.

Although the flow passage unit 20 can be mounted on the pressure detection unit 10 with the inflow port 21a and the outflow port 21b being in the opposite direction, the mounting detection sensor 17 can detect that the magnet 31c comes in close proximity as long as the magnet 31c is held by each of the pair of the magnet holding parts 31b.

In another form, the magnet 31c may be held by either one of the pair of the magnet holding parts 31b, and a pair of mounting detection sensors 17 may be arranged at positions where the pair of the magnet holding parts 31b are arranged when the mounting unit 30 is in the lock position. In such a case, even when the inflow port 21a and the outflow port 21b are mounted on the pressure detection unit 10 in the opposite direction, any one of the pair of the mounting detection sensors 17 can detect that the magnet 31c is arranged at the proximate position.

In yet another form, the mounting detection sensor 17 may be attached to the mounting unit 30 in advance, and the magnet 31c may be attached to the pressure detection unit 10. Even in such a case, the mounting detection sensor 17 can detect that the magnet 31c is arranged at the proximate position when the mounting unit 30 is in the lock position in the same manner as above.

The pressure detection device 100 according to this embodiment provides the following effects.

In the pressure detection device 100 according to this embodiment, the flow passage unit 20 is removably mounted on the pressure detection unit 10. When fluid flowing through the flow passage 21 is changed, the used flow passage unit 20 can be removed from the pressure detection unit 10 to mount a new unused one on the pressure detection unit 10. Consequently, there is no need to perform time-consuming cleaning of the flow passage 21 when fluid flowing through the flow passage 21 is changed, thereby enabling prompt work. Further, use of the new unused flow passage unit 20 can improve safety.

Further, according to the pressure detection device 100 of the present embodiment, the mounting unit 30 mounts the flow passage unit 20 on the pressure detection unit 10 with the pressure detecting surface 12aA being in contact with the pressure transmitting surface 22a under the urging force generated by the urging unit 14. Since the pressure detecting surface 12aA is in contact with the pressure transmitting surface 22a under the urging force generated by the urging unit 14, the strength of force with which the pressure detecting surface 12aA contacts the pressure transmitting surface 22a is always the same, and it is possible to prevent variation of the pressure detection characteristics obtained by the pressure detection unit 10.

Further, according to the pressure detection device 100 of the present embodiment, when the operator holds the mounting unit 30 rotatably mounted on the flow passage unit 20 and presses the mounting unit 30 against the pressure detection unit 10 in a state where the circumferential positions of the first groove 31aA and the protrusion 13aB are matched, thereby the protrusion 13aB is inserted in the first groove 31aA. When the mounting unit 30 is pressed against the pressure detection unit 10, the pressure detecting surface 12aA is in contact with the pressure transmitting surface 22a under the urging force generated by the urging unit 14.

When the operator then rotates the mounting unit 30 within a range less than one turn about the axis Y, thereby the protrusion 13aB is inserted in the second groove 31aB connected to the first groove 31aA, and the sensor unit 12 is positioned at a predetermined position on the axis Y. The state where the pressure detecting surface 12aA is in contact with the pressure transmitting surface 22a under the urging force generated by the urging unit 14 is maintained with the sensor unit 12 being positioned.

The operator is able to mount the flow passage unit 20 on the pressure detection unit 10 by a relatively easy operation of pressing the mounting unit 30 against the pressure detection unit 10 and then rotating the mounting unit 30 within a range less than one turn about the axis Y. Further, it is possible to remove the flow passage unit 20 from the pressure detection unit 10 by a relatively easy operation of rotating the mounting unit 30 about the axis Y in the reverse direction. It is therefore possible to quickly mount and remove the flow passage unit on and from the pressure detection unit compared to a case where the operator rotates a nut about the axis for multiple times to mount and remove the flow passage unit on and from the pressure detection unit.

Further, according to the pressure detection device 100 of the present embodiment, when the operator rotates the mounting unit 30 about the axis Y to arrange the recess 31aC of the second groove 31aB at the position of the protrusion 13aB, thereby the recess 31aC is pressed against the protrusion 13aB by the urging force generated by the urging unit 14. Since the recess 31aC is formed in a shape corresponding to the shape of the protrusion 13aB, once the recess 31aC is pressed against the protrusion 13aB, the mounting unit 30 is restricted from being rotated about the axis Y and is locked.

Thus, unless the operator presses and rotates the mounting unit 30 about the axis Y with pressing force against the urging force applied by the urging unit 14, the flow passage unit 20 is not removed from the pressure detection unit 10. It is thus possible to reliably maintain the state where the flow passage unit 20 is mounted on the pressure detection unit 10.

Further, according to the pressure detection device 100 of the present embodiment, by using the mounting detection sensor 17 to detect that the circumferential positions about the axis Y of the recess 31aC and the protrusion 13aB are matched, it is possible to detect that the flow passage unit 20 is secured on the pressure detection unit 10.

Further, according to the pressure detection device 100 of the present embodiment, when the circumferential positions about the axis Y of the recess 31aC and the protrusion 13aB are matched, the mounting detection sensor 17 attached to any one of the pressure detection unit 10 and the mounting unit 30 detects that the magnet 31c attached to the other of the pressure detection unit 10 and the mounting unit 30 is arranged at a proximate position. Accordingly, it is possible to reliably detect a state where the flow passage unit 20 is mounted on the pressure detection unit 10.

Further, according to the pressure detection device 100 of the present embodiment, the operator is able to easily mount the flow passage unit 20 to the pressure detection unit 10 by applying pressing force via the knob 32 against the urging force generated by the urging unit 14 to the mounting unit 30.

Other Embodiments

The guide member 18 provided to the pressure detection device 100 of the present embodiment described above is a member having a groove 18a used for guiding the flow passage 21 to a predetermined mounting position when mounting the flow passage unit 20 on the pressure detection unit 10. As the shape of the guide member 18, shapes illustrated in FIG. 14 to FIG. 16 may be employed.

Figure 14:
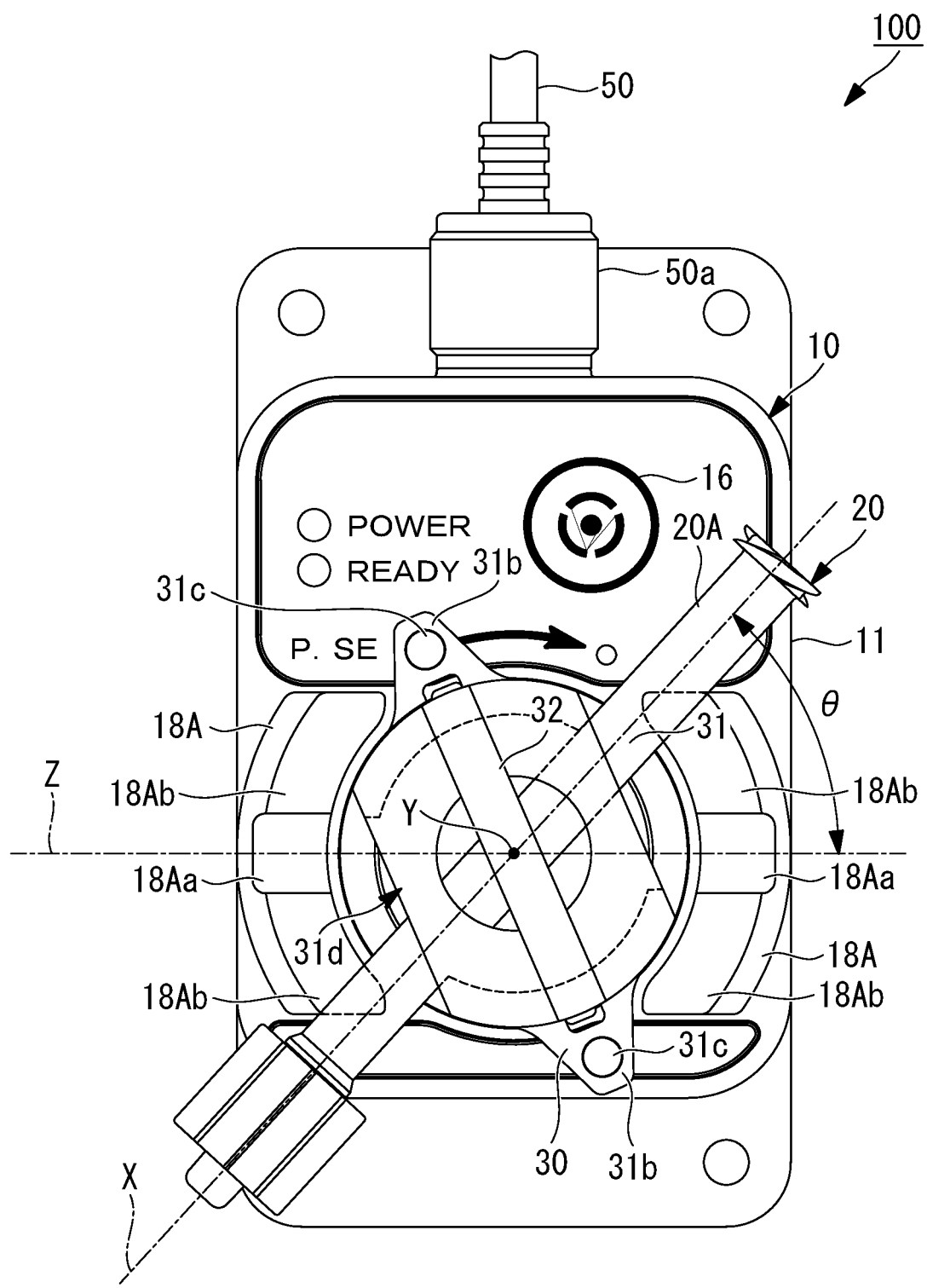
FIG. 14 is a plan view illustrating a pressure detection device of a modified example and illustrates a state where a flow passage unit is in contact with the top of guide members.
Figure 15:
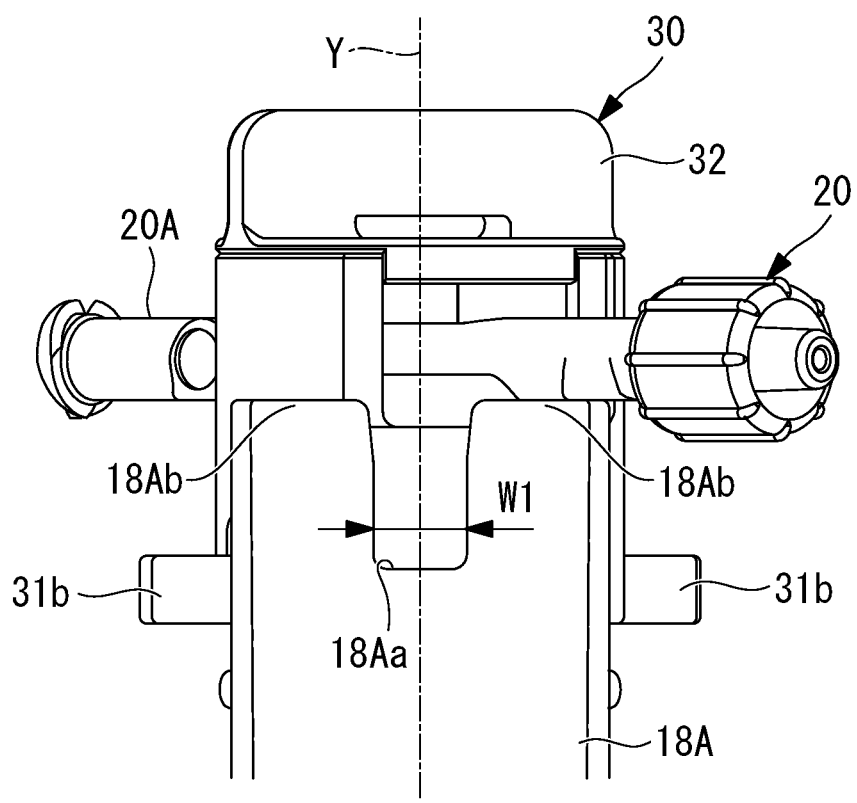
FIG. 15 is a left side view of the pressure detection device illustrated in FIG. 14 and illustrates a state where the flow passage unit is in contact with the top of the guide members.
Figure 16:
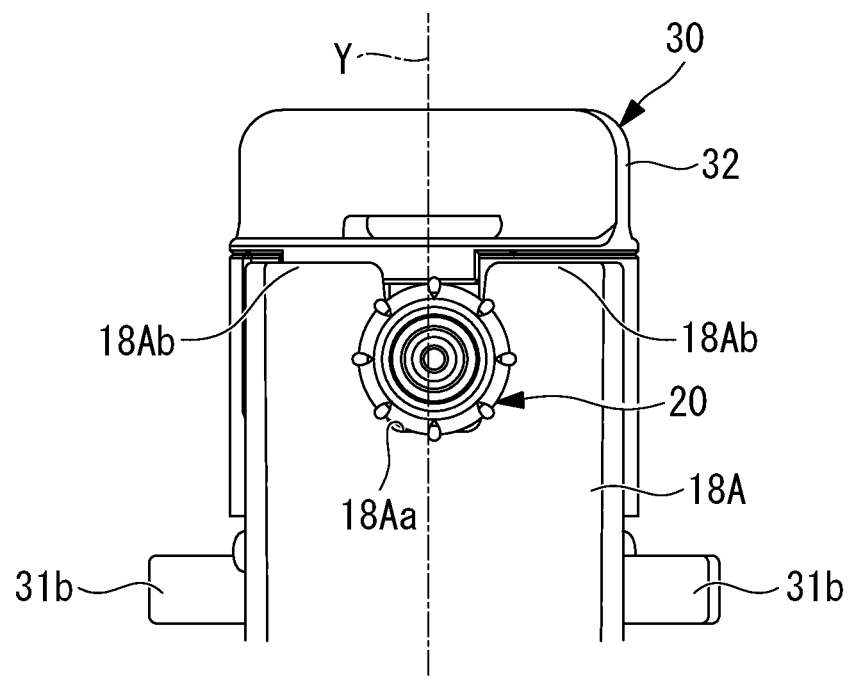
FIG. 16 is a left side view of the pressure detection device illustrated in FIG. 14 and illustrates a state where the flow passage unit has been accepted in grooves of the guide members.

FIG. 14 is a plan view illustrating a pressure detection device 100 of a modified example and illustrates a state where the flow passage unit 20 is in contact with the top of the guide member 18A. FIG. 15 is a left side view of the pressure detection device 100 illustrated in FIG. 14 and illustrates a state where the flow passage unit is in contact with the top of the guide member. FIG. 16 is a left side view of the pressure detection device 100 illustrated in FIG. 14 and illustrates a state where the flow passage unit has been accepted in the groove of the guide member.

As illustrated in FIG. 14, the pressure detection device 100 is provided with a pair of guide members 18A at positions symmetrical about the axis Y on the axis Z crossing the axis Y and extending in the horizontal direction. Each of the guide members 18A is a member formed in an arc shape circumferentially about the axis Y. The guide member 18A has a groove 18Aa arranged on the axis Z and a pair of top parts 18Ab arranged adjacent to the groove 18Aa. As illustrated in FIG. 14, each top part 18Ab is formed so as to extend circumferentially about the axis Y and within a range of an angle □ relative to the axis Z passing through the center of the groove 18Aa.

As illustrated in FIG. 15, the groove 18Aa is formed so as to be recessed below the top part 18Ab along the axis Y and has a width W1 that can accept the flow passage body 20A of the flow passage unit 20. The flow passage unit 20 is rotatable about the axis Y with respect to the mounting unit 30, and the angle rotatable about the axis Y is □ illustrated in FIG. 14.

When it is intended to mount the flow passage unit 20 on the pressure detection unit 10 in a state where the magnet holding part 31b is set to the release position, if the axis in which the flow passage body 20A extends is shifted by the angle □ relative to the axis Z as illustrated in FIG. 14, the top part 18Ab of the guide member 18A comes into contact with the flow passage body 20A.

In such a case, it is not possible to move the flow passage unit 20 to come closer to the pressure detection unit 10, and it is thus not possible to mount the flow passage unit 20 on the pressure detection unit 10. As illustrated in FIG. 15, in a state where the top part 18Ab of the guide member 18A is in contact with the flow passage body 20A, the flow passage body 20A is not accepted in the groove 18Aa. To mount the flow passage unit 20 on the pressure detection unit 10, it is required to adjust the rotation angle about the axis Y of the flow passage unit 20 relative to the mounting unit 30 so that the axis X illustrated in FIG. 14 matches the axis Z.

If the rotation angle about the axis Y of the flow passage unit 20 relative to the mounting unit 30 is adjusted so that the axis X matches the axis Z, the position about the axis Y of the flow passage body 20A and the position about the axis Y of the groove 18Aa are matched on the axis Z. In this state, since the top part 18Ab of the guide member 18A does not come into contact with the flow passage body 20A, the flow passage body 20A is accepted in the groove 18Aa as illustrated in FIG. 16, and this enables the flow passage unit 20 to be mounted on the pressure detection unit 10.

As described above, according to the pressure detection device 100 of the modified example, when it is intended to mount the flow passage unit 20 on the pressure detection unit 10 in a state where the magnet holding part 31b is set to the release position, it is not possible to mount the flow passage unit 20 on the pressure detection unit 10 without matching the position about the axis Y of the flow passage body 20A and the position about the axis Y of the groove 18Aa to each other on the axis Z. It is therefore possible to suitably prevent the flow passage unit 20 from being erroneously connected to the pressure detection unit 10 in a state where the flow passage body 20A is not accepted in the groove 18Aa.

Further, according to the pressure detection device 100 of the modified example, when the flow passage unit 20 is mounted on the pressure detection unit 10, the flow passage body 20A is reliably accepted in the groove 18Aa. When the flow passage body 20A is accepted in the groove 18Aa, the flow passage body 20A is restricted from rotating about the axis Y. Accordingly, even when external force is applied to the flow passage body 20A, rotation of the flow passage body 20A about the axis Y is prevented, and the contact state between the pressure transmitting surface 22a of the flow passage unit 20 and the pressure detecting surface 12aA of the pressure detection unit 10 does not vary. It is therefore possible to suitably prevent the pressure value detected by the sensor unit 12 from varying due to variation of the contact state between the pressure transmitting surface 22a and the pressure detecting surface 12aA.

While example embodiments have been particularly shown and described, it will be understood by those skilled in the art that various changes in form and details may be made therein without departing from the scope of the embodiments encompassed by the appended claims.

What is claimed is:

1. A pressure detection device comprising:
a pressure detection unit configured to detect a pressure transmitted to a pressure detecting surface;
a flow passage unit in which a flow passage configured to cause a fluid to flow in a flow direction from an inflow port to an outflow port and a pressure transmitting surface used for transmitting, to the pressure detecting surface, a pressure of a fluid flowing through the flow passage are formed; and
a mounting unit used for removably mounting the flow passage unit on the pressure detection unit,
wherein the pressure detection unit includes
a sensor unit having the pressure detecting surface, a holding unit configured to hold the sensor unit movably along an axis orthogonal to the pressure detecting surface, and an urging unit configured to generate urging force to urge the sensor unit toward the pressure transmitting surface, the urging force being generated by a spring, and wherein the mounting unit mounts the flow passage unit on the pressure detection unit in a state where the pressure detecting surface is in contact with the pressure transmitting surface under urging force generated by the urging unit.

2. The pressure detection device according to claim 1,
wherein the holding unit has a protrusion protruding in a direction orthogonal to the axis,
wherein the mounting unit is mounted on the flow passage unit rotatably about the axis and has a groove configured to accept the protrusion,
wherein the groove includes
a first groove extending in the axis and having an open one end, and
a second groove connected to the other end of the first groove and extending circumferentially about the axis, and
wherein the sensor unit is positioned at a predetermined position on the axis when the second groove is pressed against the protrusion by the urging force generated by the urging unit.

3. The pressure detection device according to claim 2,
wherein the second groove includes a recess formed in a shape corresponding to an outer circumferential surface of the protrusion, and
wherein the mounting unit is restricted from rotating about the axis when the recess is pressed against the protrusion by the urging force generated by the urging unit.

4. The pressure detection device according to claim 3 further comprising a sensing unit configured to detect that circumferential positions about the axis of the recess and the protrusion are matched.

5. The pressure detection device according to claim 4,
wherein a magnet is attached to any one of the pressure detection unit and the mounting unit, and
wherein the sensing unit is attached to the other of the pressure detection unit and the mounting unit and detects that the magnet is arranged at a proximate position, and when the circumferential positions about the axis of the recess and the protrusion are matched, the magnet is arranged at the proximate position.

6. The pressure detection device according to claim 1,
wherein the mounting unit has a knob extending in a direction orthogonal to the axis and configured to enable an operator to apply, in a direction along the axis, pressing force against the urging force generated by the urging unit.

7. The pressure detection device according to claim 1,
wherein the urging unit includes the spring and a base member,
the spring is configured to generate the urging force in accordance with a distance along the axis from one end to the other end, one end being in contact with the base member, the other and being in contact with the sensor unit.

* * * * *